United States Patent [19]
Demboske

[11] Patent Number: 5,479,877
[45] Date of Patent: Jan. 2, 1996

[54] BIRDHOUSE ASSEMBLY KIT AND METHOD OF ERECTING A BIRDHOUSE

[76] Inventor: Edmund J. Demboske, 7000 Rue deMarquis, Naples, Fla. 33963

[21] Appl. No.: 349,511

[22] Filed: Dec. 5, 1994

[51] Int. Cl.$^6$ ..................................................... A01K 31/00
[52] U.S. Cl. ............................. 119/23; 446/127; 119/52.2
[58] Field of Search ............................. 119/23, 19, 52.3, 119/52.2, 57.8, 57.9; 446/127, 119, 478; 52/289, 703

[56] References Cited

U.S. PATENT DOCUMENTS

| | | | |
|---|---|---|---|
| D. 134,814 | 1/1943 | Hoskins . | |
| D. 249,087 | 8/1978 | Simmons | D30/15 |
| D. 269,468 | 6/1983 | Babcock et al. | D30/3 |
| 2,236,593 | 4/1941 | Booth | 119/23 |
| 2,312,551 | 3/1943 | Hoskins | 119/23 |
| 2,392,532 | 1/1946 | Hyde | 119/23 |
| 3,053,226 | 9/1962 | Dunn | 119/23 |
| 3,144,852 | 8/1964 | Messeas | 119/19 |
| 3,195,507 | 7/1965 | Miller | 119/23 |
| 3,866,577 | 2/1975 | Mathis | 119/19 |
| 4,167,917 | 9/1979 | Noll | 119/23 |
| 5,186,123 | 2/1993 | Cuddy | 119/23 |

*Primary Examiner*—Todd E. Manahan
*Attorney, Agent, or Firm*—James H. Beusse

[57] ABSTRACT

A birdhouse for assembly without tools comprises a front wall and a rear wall of substantially identical configuration. Each of the front and rear walls has a rectangular lower portion and a triangular upper portion. The triangular upper portion defines a peak roof line and the lower portion of each of the front and rear walls has slots extending parallel to the edges of a face. A plurality of blind holes is formed in each face within the area defined by the slots. The front wall includes an opening for admitting birds. A plurality of dowels extends between the front and rear walls and are fixed in the blind holes for assembling the front wall to the rear wall. A pair of sheet material members extends from a peak of the triangular portion along the peak roof line to form a peaked roof. The first and second side walls are adapted for sliding into slots along opposite side edges of the front and rear walls. A floor of sheet material is adapted for sliding into slots along a bottom edge of the front and rear walls. The floor extends outward of the slots along the opposite side edges for supporting the side walls in the slots.

12 Claims, 2 Drawing Sheets

BIRDHOUSE ASSEMBLY KIT AND METHOD OF ERECTING A BIRDHOUSE

The present invention relates to suspended birdhouses and, more particularly, to a birdhouse which is assembled without tools and includes removable side walls for changing the configuration of the birdhouse to a feeding station.

BACKGROUND OF THE INVENTION

Birdhouses in general are not complex structures. However, most available birdhouses sold as kits require some degree of manual skill for assembly, i.e., the houses are usually assembled with nails and/or screws. U.S. Pat. No. 3,195,507 illustrates one attempt to create a birdhouse kit that can be assembled without fasteners but the result is a non-conventional structure, i.e., the resulting birdhouse does not have the desired configuration of a common, peaked roof structure. Further, the structure of that patent does not avail itself of modification to a feeding or open-sided nesting station.

SUMMARY OF THE INVENTION

It is an object of the present invention to provide a birdhouse which can be assembled by children to encourage interest in birds.

It is another object of the present invention to provide a birdhouse which can be assembled without mechanical devices or fasteners.

It is still another object of the present invention to provide a birdhouse which is easily assembled and which can be converted from a closed birdhouse to an open feeding or nesting station.

In an illustrative form, a birdhouse in accordance with the present invention is constructed with a front wall and a rear wall of substantially identical configuration. Each of the front and rear walls have a rectangular lower portion and a triangular upper portion with the triangular upper portion defining a peak roof line for the birdhouse. The lower portion of each of the front and rear walls has a plurality of slots extending parallel to edges of the rectangular portion on an inner face of the wall. The inner face is defined as the face of the front and rear wall which is internal of the birdhouse when the birdhouse is an assembled configuration. Each of the inner faces of the front and rear wall are also drilled with a plurality of spaced blind holes adapted for accepting a plurality of dowels. The front wall includes an entry opening for admitting birds into the birdhouse. The front and rear wall are attached by dowels extending therebetween and fastened into the blind holes formed on the inner surface of each of the walls. The dowels may be glued into position to assure integrity of the assembly. In one embodiment, the peaked roof is formed by a pair of sheet-like members which are laid on the top triangular portion and abutted at the peak of the roof and then glued to the edges of the front and rear walls. In another embodiment, the roof is formed by cutting slots along the top edges of the front and rear walls and sliding sheet-like roof members into the slots. The roof members may be glued in place. The side walls are also sheet-like members which slide into the slots on the inner faces of the front and rear walls and are then retained in the slots by a floor member which also slides into a slot parallel to the bottom edge of the front and rear walls. The side walls may be inserted after the roof has been glued to the birdhouse by turning the birdhouse upside down and dropping the sidewalls into the slots. The floor is then slid into its slot and the house again inverted so that the side walls drop downward and rest against the floor member. In one form, the floor is held in position by drilling a pair of holes through the floor adjacent one of the dowels and then passing a tie through one of the holes, over a dowel and back through the other hole where it can be tied externally of the birdhouse to fasten the floor to the dowel so that it cannot slide out of the slot.

The invention also includes the method of construction of a birdhouse including the steps of forming a pair of opposite end walls having a lower rectangular portion and an upper triangular portion with each of the end walls having an inner face and an outer face. Slots are cut parallel to exposed edges of the rectangular portions of the end walls along the inner faces. The method further includes the step of drilling blind holes in at least four locations at approximately each corner of the rectangular portion such that each hole in an inner face of one of the end walls aligns with a corresponding hole in an inner face of another of the end walls. Dowels are then cut to a preselected equal length and used to join the opposite end walls by inserting the dowels in the blind holes in each of the end walls after applying adhesive to the ends of the dowels. The method further includes the step of attaching a pair of sheet-like members to the exposed upper edges of the triangular portion of the joined opposite end walls to form a peaked roof. Preferably, the method includes the step of spreading adhesive on the exposed edges of the triangular portion so that the roof members are attached by adhesive bonding. The method further includes the steps of sliding at least one side wall member into the opposing slots formed in the inner faces of the opposite end walls and sliding a floor member into the opposing slots formed in the inner faces of the opposite end walls along the lower edge. The floor member extends under the side wall members and supports the side wall members in an assembled position.

In still another form, the invention includes the assembled birdhouse but with one of the side wall members removed so that the house is open from one side and thereby forms an open feeding station or an open nesting station for birds which refuse to nest inside birdhouses. In still another form, at least one of the side walls can be replaced by a transparent sheet so that the nesting of the birds within the birdhouse can be observed. Still further, the side walls may be replaced by perforated members to allow air flow through the birdhouse.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
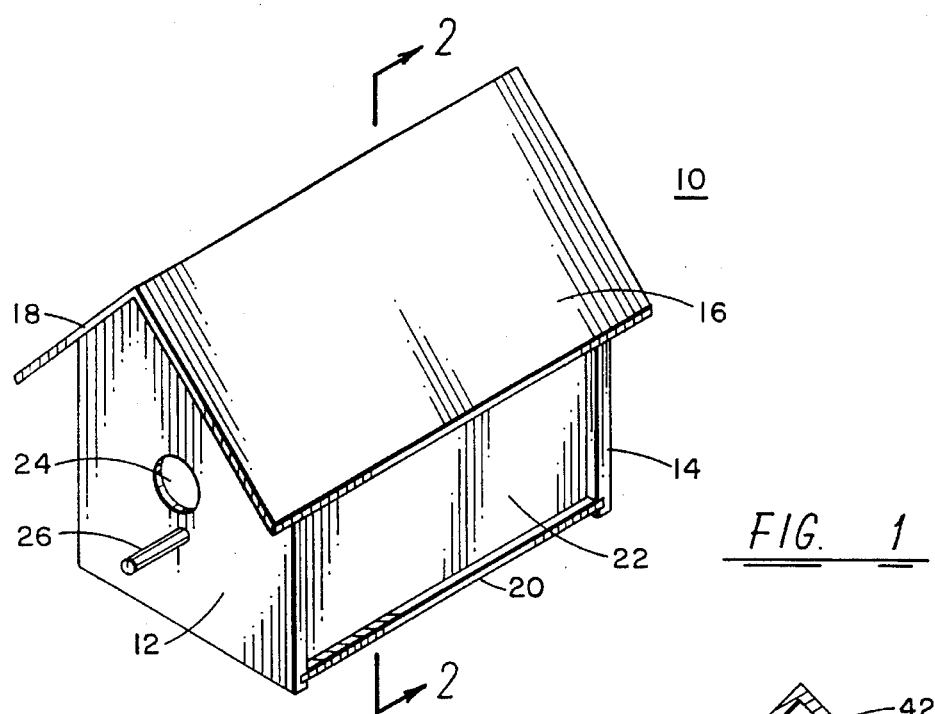
FIG. 1 is a perspective view of an assembled birdhouse in accordance with the present invention.

Referring now to FIG. 1, there is shown a perspective view of a birdhouse 10 in accordance with the present invention. The birdhouse 10 includes a front wall 12, a rear wall 14 and a peak roof defined by a pair of roof members 16 and 18. A sheet-like floor member 20 defines the bottom of the birdhouse and a side wall 22 protects the birdhouse side. Ingress and egress is provided by an entry opening 24 in the front wall 12 of the birdhouse. A forward dowel section 26 may be positioned underneath the entry 24 to provide a convenient place for a bird to land before entering the entry 24.

Figure 3:
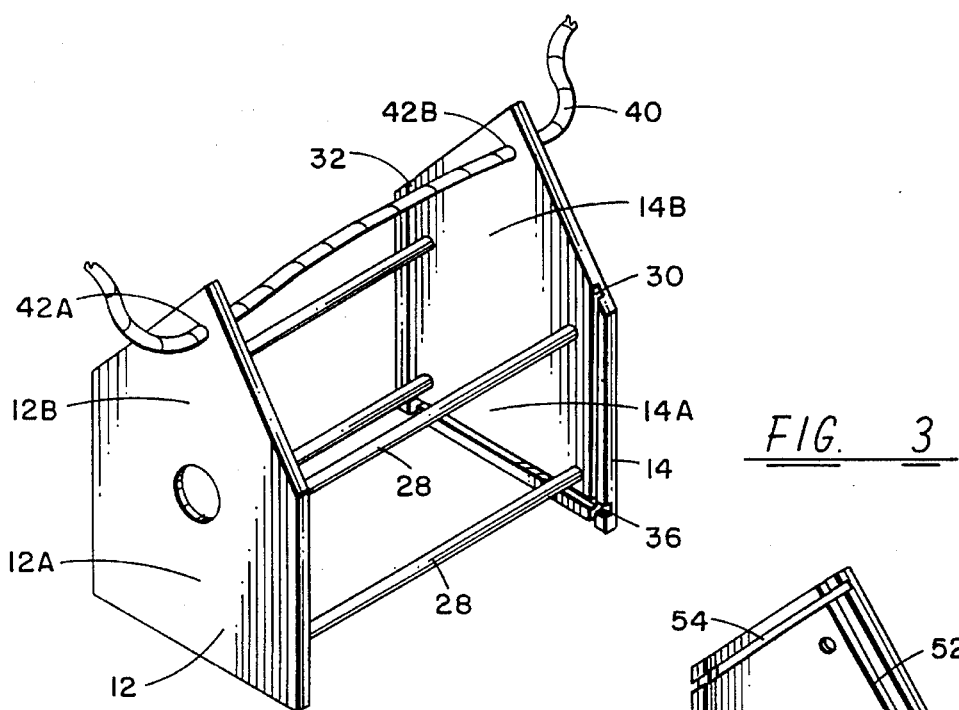
FIG. 3 is a perspective view of the interconnection of the end walls of the birdhouse of FIG. 1 showing the use of dowels for connection.

A primary feature of the present invention is the ease of assembly without use of any hardware or tools. The kit can be sold for use by a child and enable the child to assemble the birdhouse into the form shown on FIG. 1 without any undue effort. As will become apparent, the birdhouse is assembled using only glue to hold the roof to the end members 12 and 14 and to attach the members 12 and 14 to one another using dowels. Referring to FIG. 3, there is shown a perspective view of the end wall members 12 and 14 fastened together by means of a plurality of dowels 28. Each of the end wall members 12 and 14 has a lower rectangular portion 12a, 14a, respectively and an upper triangular portion 12b,14b, respectively. The rectangular sections 12a,14a define the main body or shape of the birdhouse 10 while the upper triangular sections 12b,14b define an upper edge for establishing a peak roof configuration of the birdhouse.

Each of the end walls 12,14 have inner faces which would be located inside the assembled birdhouse and which are designed to be substantially identical in shape. The inner faces face each other in the view of FIG. 3 with outer faces of the end walls 12,14 directed outwardly. Each of the inner faces is substantially identical and concludes a plurality of slots extending parallel to the edges of the lower rectangular portions 12a,14a. The vertically extending slots 30 and 32 on opposite side edges of the end walls support side walls 22 and 34 of the birdhouse. The lower slot 36 supports the floor of the birdhouse. The assembled birdhouse may be suspended from a tree or other support by means of a rope or cord 40 passing through apertures 42a and 42b in respective ones of the opposite end walls 12 and 14.

Figure 2:
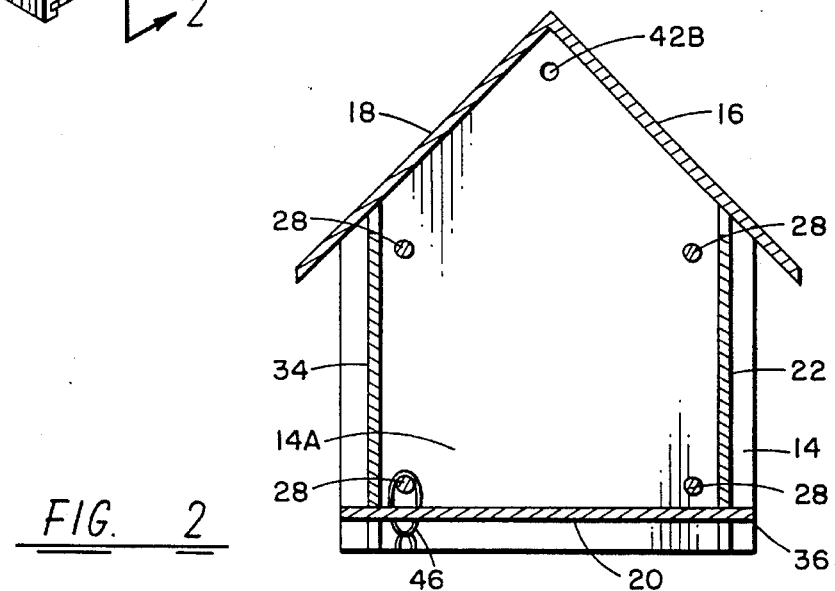
FIG. 2 is a cross-sectional view of the birdhouse of FIG. 1 taken along the line 2—2 of FIG. 1.

Considering FIG. 2 in conjunction with FIG. 3, it can be seen that the end wall 14 includes slots 30 and 32 for supporting the side wall members 22 and 34. At the bottom of the rectangular portion 14a of the end wall there is another slot 36 which supports the floor 20 of the birdhouse. It will be seen that the width of the floor 20 is selected so that when installed in the slot 36, the ends of the floor extend almost completely across the width of the end wall 14 passing under the side walls 22 and 34 in the slots 30 and 32. In this manner, the floor 20 supports the side walls 22 and 34 in their assembled configuration within the birdhouse 10. The dowels 28 are set into blind holes drilled into the end walls 12 and 14 and are preferably glued into position during assembly.

Figure 4:
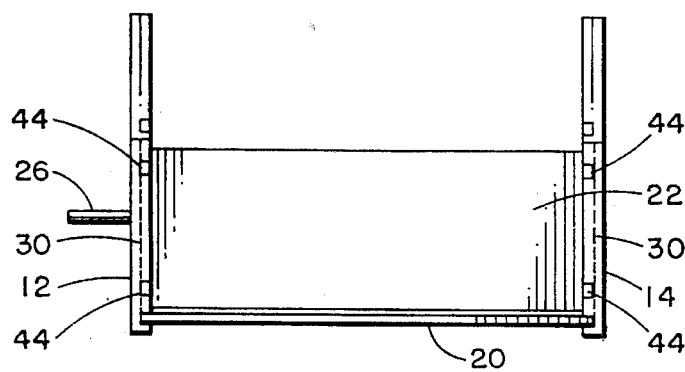
FIG. 4 is a side view of the assembled birdhouse of FIG. 1 with the roof removed.

FIG. 4 is a side view of the birdhouse 10 with the roof members 16 and 18 removed so that the position of the side wall 22 with respect to the floor 20 can be appreciated. The phantom lines 30 in each of the end walls 12,14 indicate the vertically extending slots through the end walls whereas the phantom lines at 44 indicate the blind holes drilled in the end walls 12 and 14 for supporting the dowels 28.

In assembling the birdhouse 10, it will be seen that the two end walls which are supplied in a kit as precut sections having slots 30,32 and 36 in each of the inner faces and with pre-drilled holes 44 for accepting the dowels 28 are first joined together by squeezing wood glue in each of the dowel holes 44 and then inserting the ends of the dowels 28 into each of the holes and joining the end walls 12 and 14 together. The roof is next positioned on the birdhouse by gluing the two sheet-like panels 16 and 18 to the precut roof line defined by the triangular end sections 12b and 14b of the end walls. Once the wood glue has set sufficiently to bond the roof member 16 and 18 to the end walls, the birdhouse can be turned upside down and the side walls slipped into the slots 30 and 32. The floor 20 is then passed through the slot 36 and when the birdhouse is re-inverted, the side walls 22 and 34 are supported by the floor 20. If it is desirable to hang the birdhouse from a tree or other support, a cord 40 may be passed through the pre-drilled holes 42a,42b prior to assembling the side walls and floor. The short section of dowel 26 forming the initial roost for a bird is glued into a blind hole drilled below the entry opening 24 after the birdhouse has been assembled. If desired, a piece of string or a twist tie of a type commonly available may be passed through a pair of pre-drilled holes in floor 20 and looped over one of the dowels 28 before twisting the ends of the tie together beneath the floor 20 to hold the floor 20 in position with respect to the dowel 28. FIG. 2 illustrates a tie 46 which has been passed through a first hole in floor 20, looped over one of the dowels 28 and passed back through a second hole in floor 20 with the ends of the tie 46 being twisted together so that the floor 20 can no longer move from side to side without releasing the tie.

It will be appreciated that either of the side walls 22 or 34 may be replaced by transparent members such as a plastic sheet by simply sliding the floor 20 to one side and removing one of the side walls and replacing it with a transparent sheet cut to the same dimensions. This will allow the activities of the birds within the birdhouse to be observed. In another form, the two side walls 22 and 34 may be replaced by perforated sheets such as perforated Masonite commonly available in hardware stores so that a passage for air to blow through the birdhouse is provided. It will also be noted that the side walls 22 and 34 are preferably designed so that they are slightly below the roof member 16 and 18 so that air will flow over the tops of the side walls 22 and 34.

Figure 5:
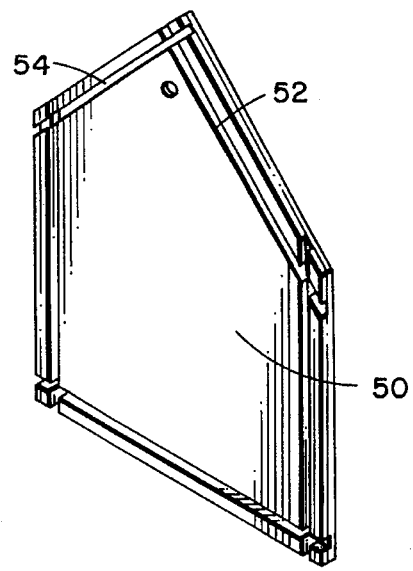
FIG. 5 is an alternate embodiment of an end wall of the birdhouse of FIG. 1.

Referring to FIG. 5, there is shown an alternate embodiment of an end wall member 50 which may be used in place of the members 12,14. Member 50 differs in having slots 52,54 cut parallel to the top edges of the member. This embodiment allows the roof members 16,18 to be assembled similar to the side walls, i.e., by sliding the roof members into the slots 52,54. For this purpose, the roof members may be shorter than those used in FIG. 1.

Figure 6:
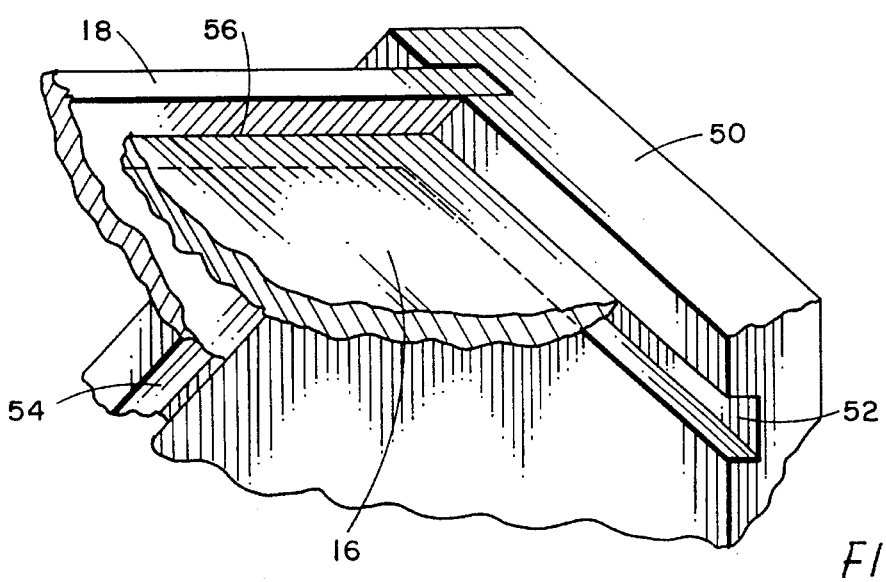
FIG. 6 is a cutaway view of a roof construction using the end wall of FIG. 5.

FIG. 6 is a cutaway view of a pair of roof members 16,18 assembled to member 50. The members 16,18 may be held in place by glue placed in slots 52,54. Further, it is desirable to form a glue joint at the abutting intersection 56 of members 16,18.

It will be appreciated that what has been described as a simple kit for a birdhouse which when assembled will have the configuration of a common peak roof type birdhouse of a more expensive variety for which is easily assembled without special tools or fasteners. The birdhouse is particularly adapted for use by young children who are able to build a birdhouse without having any previous mechanical or carpentry skills. Accordingly, the birdhouse is intended to be used by such children to encourage their interest in birds.

While the invention has been described in what is presently considered to be a preferred embodiment, various modifications and variations will become apparent to those skilled in the art. It is intended therefore that the invention not be limited to the specific illustrated embodiment but be interpreted within the full spirit and scope of the patented claims.

What is claimed is:

1. A birdhouse comprising:
   a front wall and a rear wall of substantially identical configuration, each of said front and rear walls having a rectangular lower portion and a triangular upper portion, said triangular upper portion defining a peak roof line, said lower portion of each of said front and rear walls having slots extending parallel to edges of a face thereof and a plurality of blind holes formed in each face within the area defined by the slots, said front wall including an opening for admitting birds;
   a plurality of dowels extending between said front and rear walls and fixed in the blind holes for assembling said front wall to said rear wall;
   a pair of sheet material roof members extending from a peak of said triangular portion along the peak roof line to form a peaked roof;
   first and second side walls adapted for sliding into said slots along opposite side edges of said front and rear walls;
   a floor of sheet material adapted for sliding into said slots along a bottom edge of said front and rear walls, said floor extending outward of said slots along said opposite side edges for supporting said side walls in said slots and
   a pair of holes formed in said floor approximately underlying one of said dowels and a tie means extending through one of said holes, over said one of said dowels and through another of said hole for typing said floor to said dowel.

2. The birdhouse of claim 1 wherein at least one of said side walls is formed of a transparent material for allowing observation of birds in the birdhouse.

3. The birdhouse of claim 1 wherein at least one of said side walls is removed whereby the birdhouse functions as one of a feeding and nesting shelf.

4. The birdhouse of claim 1 wherein said side walls are formed of perforated sheet material to permit air flow through the birdhouse.

5. The birdhouse of claim 1 wherein said pair of sheet material roof members are inserted in slots cut in said front and rear walls adjacent said upper portion thereof.

6. The birdhouse of claim 1 wherein said roof members are glued to an upper edge of said triangular upper portion of said front and rear walls, a portion of said roof members extending forward of an outer surface of at least said front wall for providing a porch-like covering.

7. A method of construction of a bird house:
   forming a pair of opposite end walls having a lower rectangular portion and an upper triangular portion, each of the end walls having an inner face and an outer face;
   cutting slots parallel to exposed edges of the rectangular portions of the end walls along the inner faces thereof;
   drilling blind holes in at least four locations at approximately each corner of the rectangular portion, each hole in an inner face of one of the end walls aligning with a corresponding hole in an inner face of another of the end walls;
   cutting at least four dowels to a preselected equal length;
   joining the opposite end walls by inserting the dowels in the blind holes in each of the end walls;
   attaching a pair of sheet-like members along upper edges of the upper triangular portion of the joined opposite end walls to form a peaked roof;
   sliding at least one side wall member into the opposing slots formed in the inner faces of the opposite end walls along side edges thereof; and
   sliding a floor member into the opposing slots formed in the inner faces of the opposite end walls along a lower edge thereof, the floor member extending under the at least one side wall member for supporting the side wall member in an assembled position.

8. The method of claim 7 and including the step of adhesively bonding the dowels to the end walls.

9. The method of claim 8 and including the steps of drilling a pair of holes in the floor member and passing a tie through the holes and over an adjacent dowel for tying the floor in a substantially fixed position.

10. The method of claim 7 and including the step of adhesively bonding the sheet-like members to the triangular portion of the end walls.

11. The method of claim 7 and including the step of drilling an entry hole in one of the end walls and sizing the entry hole to exclude selected birds.

12. The method of claim 7 wherein said attaching step includes the steps of:
    forming a pair of slots in each of the opposite end walls parallel to and adjacent the upper edges thereof;
    sliding the sheet-like members into the slots with one of the members having an edge abutting a bottom surface of another of the members; and
    adhesively bonding the one of the members to the another of the members at least along the abutting edge.

* * * * *